(12) United States Patent
Tongesayi

(10) Patent No.: US 8,828,235 B2
(45) Date of Patent: Sep. 9, 2014

(54) METHOD FOR REMOVING CONTAMINANTS FROM WATER USING THIOL-MODIFIED SURFACES CONTAINING ESTER LINKAGES

(75) Inventor: Tsanangurayi Tongesayi, Howell, NJ (US)

(73) Assignee: Monmouth University, West Long Branch, NJ (US)

( * ) Notice: Subject to any disclaimer, the term of this patent is extended or adjusted under 35 U.S.C. 154(b) by 0 days.

(21) Appl. No.: 13/527,166

(22) Filed: Jun. 19, 2012

(65) Prior Publication Data

US 2013/0048567 A1 Feb. 28, 2013

Related U.S. Application Data

(60) Provisional application No. 61/525,886, filed on Aug. 22, 2011.

(51) Int. Cl.
| | |
|---|---|
| *B01D 15/20* | (2006.01) |
| *B01J 39/00* | (2006.01) |
| *C02F 101/20* | (2006.01) |
| *C02F 101/10* | (2006.01) |
| *C02F 1/28* | (2006.01) |

(52) U.S. Cl.
CPC ............. *C02F 1/28* (2013.01); *C02F 2101/20* (2013.01); *C02F 2101/103* (2013.01); *C02F 1/288* (2013.01); *C02F 1/286* (2013.01)
USPC ............................ 210/668; 210/688; 210/681

(58) Field of Classification Search
CPC ...... C02F 2101/103; C02F 1/288; C02F 1/28; C02F 2010/20; C02F 1/286
USPC ................... 210/668, 688, 670, 681; 528/373
See application file for complete search history.

(56) References Cited

U.S. PATENT DOCUMENTS

| | | | |
|---|---|---|---|
| 5,397,852 A | 3/1995 | Edward et al. | |
| 7,048,853 B2 | 5/2006 | Witham et al. | |
| 7,404,901 B2 | 7/2008 | Pinnavaia et al. | |
| 7,820,052 B2 | 10/2010 | Gadgil | |
| 7,892,436 B2 | 2/2011 | Gadgil | |
| 8,092,686 B2 * | 1/2012 | Wright et al. | 210/660 |
| 2007/0181502 A1 * | 8/2007 | Johnson et al. | 210/656 |
| 2010/0051538 A1 | 3/2010 | Freeman et al. | |
| 2010/0143329 A1 | 6/2010 | Larsen | |

OTHER PUBLICATIONS

Hubicki et al. "Application of Ion Exchange Methods in Recovery of Pd(II)ions—a Review" 2008, Chem Anal., pp. 759-784.*
Ritchie et al. "Polycysteine and Other Polyamino Acid Functionalized Microfiltration Membranes for Heavy Metal Capture", 2001, Environ. Sci, Technol, 35, pp. 3252-3258.*
Teixeira et al. "Development of a Biosorbent for Arsenite: Structural Modeling Based on X-ray Spectroscopy" 2005, Environ. Sci. Technol, 39, pp. 895-900.*
Arenillas et al. "Surface modification of low cost carbons for their applications in the emvironmental protection" 2005, Applied Surface Science 252, pp. 619-624.*
Yantasee et al, "Removal of Heavy Metals from Aqueous Systems with Thiol Functionalized Superparamagnetic Nanoparticles," 2007, Enviton. Sci. Technol, 41, pp. 5114-5119.*
Elbert et al, "Surface Treatments of Polymers for Biocompatibility," 1996, Annual Reviews, 26, pp. 365-394.*
Ritchie et al, "Polysysteine and other Polyamino Acid Functionalized Microfiltration Membranes for Heavy Metal Capture," 2001, Environ. Sci. Technol., 35, pp. 3252-3258.*
Teixeira et al, "Development of a Biosorbent for Arsenite: Structure Modeling Based on X-ray Spectroscopy," 2005, Environ. Sci. Technol., 39, pp. 895-900.*
Hubicki et al, "Application of Ion Exchange Methods in Recovery of PD(II) ions—A Review," 2008, Chem. Anal, 53, pp. 759-784.*
Muthuvijayan et al, "Analysis of functionalized polyethylene terephtalate with immobilized NTPDase and cysteine," 2009, Acta Biometerialia, 5, pp. 3382-3393.*
PCT Search Report, Oct. 19, 2012, 10 pages, US.
Gappa-Fahlenkamp H., Duan X., Lewis R.S., "Analysis of immobolized L-cystein on polymers", Wiley InterScience (www.interscience.wiley.com), Oct. 8, 2004, pp. 519-527, Wiley Periodicals, Inc. US.

* cited by examiner

*Primary Examiner* — Nam Nguyen
*Assistant Examiner* — Claire Norris
(74) *Attorney, Agent, or Firm* — Keith D. Nowak; Libby Babu Varghese; Carter Ledyard & Milburn LLP

(57) ABSTRACT

The method manipulates the chemical mechanism of the toxicity of arsenic in humans, which involves the binding of arsenic by thiols on proteins and peptides, to remove arsenic from water. PET vessels and/or acrylic resins are treated with thiols which in turn bind arsenic to remove arsenic from water.

13 Claims, 3 Drawing Sheets

| Test No. | Volume of As(III) solution/mL | [As(III)] before Test/ppb | Adsorbent material | [As(III)] after Test/ppb | % Remo-val | MCL in drinking water/ppb |
| --- | --- | --- | --- | --- | --- | --- |
| 1 | 400 | 100 | *PET-cys, pH 7 | ND | 100 | 10 |
| 2 | 400 | 100 | *PET-cys, pH 5 | 3.41 | 96.6 | 10 |
| 3 | 400 | 100 | **PET-cys, pH 7 | ND | 100 | 10 |
| 4 | 400 | 100 | **PET-cys, pH 5 | 8.51 | 91.5 | 10 |
| 5 | 400 | 100 | *XAD-7-cys, pH 7 | ND | 100 | 10 |
| 6 | 400 | 100 | *XAD-7-cys, pH 5 | ND | 100 | 10 |
| 7 | 400 | 100 | **XAD-7-cys, pH 7 | ND | 100 | 10 |
| 8 | 400 | 100 | **XAD-7-cys, pH 5 | ND | 100 | 10 |
| 9 | 50 | 100 | ***XAD-7-cys, pH 7 | 1.43 | 98.6 | 10 |
| 10 | 50 | 100 | ***XAD-7-cys, pH 5 | 1.63 | 98.4 | 10 |

Experimental data on the use of PET-cysteine and XAD-7-cysteine to remove As(III) from synthetic water sample at pH 5 and 7

*PET-cys: PET-cystine converted to PET-Cysteine using Zn powder in 5% acetic acid

**PET-cys, pH 7: PET-cystine converted to PET-Cysteine using 1M dithiothreitol

*XAD-7-cys: XAD-7-cystine converted to XAD-7-Cysteine using Zn powder in 5% acetic acid

**XAD-7-cys: XAD-7-cystine converted to XAD-7-Cysteine using 1M dithiothreitol

***XAD-7-cys: Cysteine hydrogen-bonded to XAD-7 at pH 1.12 and the XAD-7-cysteine air-dried before use ND: Not Detected (Below detection limit)

MCL: Maximum contaminant level (U.S. EPA)

Note: 10 g of adsorbent material (PET or XAD-7) was used in each experiment.

Figure 3

METHOD FOR REMOVING CONTAMINANTS FROM WATER USING THIOL-MODIFIED SURFACES CONTAINING ESTER LINKAGES

PRIORITY AND RELATED APPLICATION

This application claims priority to U.S. Provisional Patent Application Ser. No 61/525,886, filed Aug. 22, 2011, entitled "REMOVAL OF ARSENIC FROM DRINKING WATER USING THIOL-MODIFIED BEVERAGE AND PLASTIC PET BOTTLES," which is hereby incorporated by reference in its entirety.

FIELD OF THE INVENTION

The present invention relates to water contaminant removal. Specifically the present invention relates to water treatment for removal of arsenic.

BACKGROUND OF THE INVENTION

Arsenic is a naturally occurring element whose average level is 1.8 mg/kg of the earth's crust. Biological activity, weathering and volcanic eruption (97% natural input of arsenic) together with anthropogenic inputs, especially mining activities, are responsible for the distribution of arsenic in the environment. The most prevalent inorganic forms of arsenic are arsenate and arsenite, and the predominant species present is determined by either the chemical (redox) and/or microbiological condition of the aqueous or soil environment. Arsenite is more mobile in soil and sediment environments than arsenate because of its neutral, uncharged molecular state ($H_3AsO_3$) in common soil/sediment pH ranges (pH 5-8). Arsenite has been shown to be more prevalent under reducing conditions in natural water systems as arsenous acid species ($H_3AsO_3$, $H_2AsO_3^-$, $HAsO_3^{-2}$)$_5$ whereas arsenate ($H_3AsO_4$, $H_2AsO_4^-$, $HAsO_4^{-2}$, $AsO_4^{-3}$) is more stable in oxygenated waters. Arsenite has a strong affinity for sulfur and readily adsorbs or coprecipitates with metal sulfides.

Arsenic is toxic to plants, animals and humans. It accumulates in living tissues because of its high affinity for proteins, lipids and other cellular components. Arsenic is also a carcinogen and exposure can lead to cardiovascular, pulmonary, immunological, neurological and endocrine disorders in addition to skin, lung, bladder and kidney cancers. Drinking water remains one of the most significant routes of arsenic exposure to humans. The recognition of the extent of arsenic toxicity resulted in the reduction of the maximum contaminant level (MCL) of arsenic from 50 ppb to 10 ppb. The reduction in the MCL of the metalloid requires the development of more efficient technologies than currently exist for the treatment of arsenic in water.

Current methods used to remove arsenic from water for human consumption include adsorptive media, anion exchange, coagulation/filtration, and membrane separation. The adsorptive media method involves removing arsenic ions by adsorption sites on an adsorption media. Granular activated alumina and various types of iron oxide composite have been used as adsorptive media with some degree of success. Both activated alumina and iron oxides are highly selective towards arsenate. Selectivity for arsenate over arsenite stems from the fact that in the pH range of 4 to 10, arsenite is predominantly neutral while arsenate is negatively charged, and can hence easily adsorb onto positively changed adsorption sites. Removal of arsenite using these methods would require pre-oxidation to arsenate.

The anion exchange method involves exchanging arsenic ions from a solution onto a resin. This method is specific for arsenate because of its negative charge at pH 4 or higher. Arsenite is neutral at in the pH range of 4 to 10. The resins used are usually in chloride from and during the exchange, the chloride will be replaced by arsenate on the exchange sites. The coagulation/filtration method also includes the removal of iron from water. Here iron and arsenate are simultaneously removed in areas with high iron concentrations. The efficiency of the arsenic removal system can be enhanced by adding iron (ferric sulfate) to the water. The other coagulant that is also used is alum. Finally, the membrane separation (reverse osmosis) method is a pressure-driven process that removes both arsenate and arsenite from water for small water systems.

Most current arsenic removal methods, except the membrane filtration method, are selective for arsenate. Selectivity for arsenate is a result of the negative charge on the arsenate species at pH 4 or higher. In addition to being arsenate specific, these methods are expensive, cumbersome and complex. Much of these processes are inaccessible to the poor communities that need them.

A method of treating water to remove contaminants such as arsenic is desired that is inexpensive for world-wide use. The method should and simple to use by the masses. The method should have few steps and should be able to treat water for any purpose and remove other contaminants such as most toxic heavy metals and metalloids in water.

BRIEF SUMMARY OF THE INVENTION

Contaminants such as arsenic, As(III) and As(V), and other toxic metalloids and metals are removed from water by directly binding thiol-containing molecules to a surface having ester linkages. The surface used in the present invention include PET or XAD-7. The thiol-containing molecules employed include cysteine, cystine and glutathione with the cysteine being dimerized prior to binding to said surface. The disulfide bonds in cystine and glutathione are reduced after binding to expose the thiol functional groups which are important for arsenic binding.

The thiol binding occur via acylation or hydrogen bonding. Acylation occurs at temperatures of about 35-45° C., in one embodiment acylation occurs at about 40° C. and at basic pH levels. Disulfide bonds in said thiol-containing molecule are reduced at about 65-75° C., preferably reduction of disulfide bonds occur at about 70° C. to produce the thiol or thiolate using dithiothreitol or zinc powder in 5% acetic acid. Contaminants attach to thiols (SH), when pH is low, or thiolates (S−), when pH is high, in the thiol-containing molecule and are removed from the water. Hydrogen bonding of thiol-containing molecules may occur at acidic pH levels and forgo the need to dimerize cysteine to cystine and subsequently reduce the disulfide bonds.

BRIEF DESCRIPTION OF THE DRAWING

FIG. 3 shows data obtained in which prepared thiol bound PET drinking bottle was used to remove As(III) in samples.

DETAILED DESCRIPTION OF THE INVENTION

Figure 1:
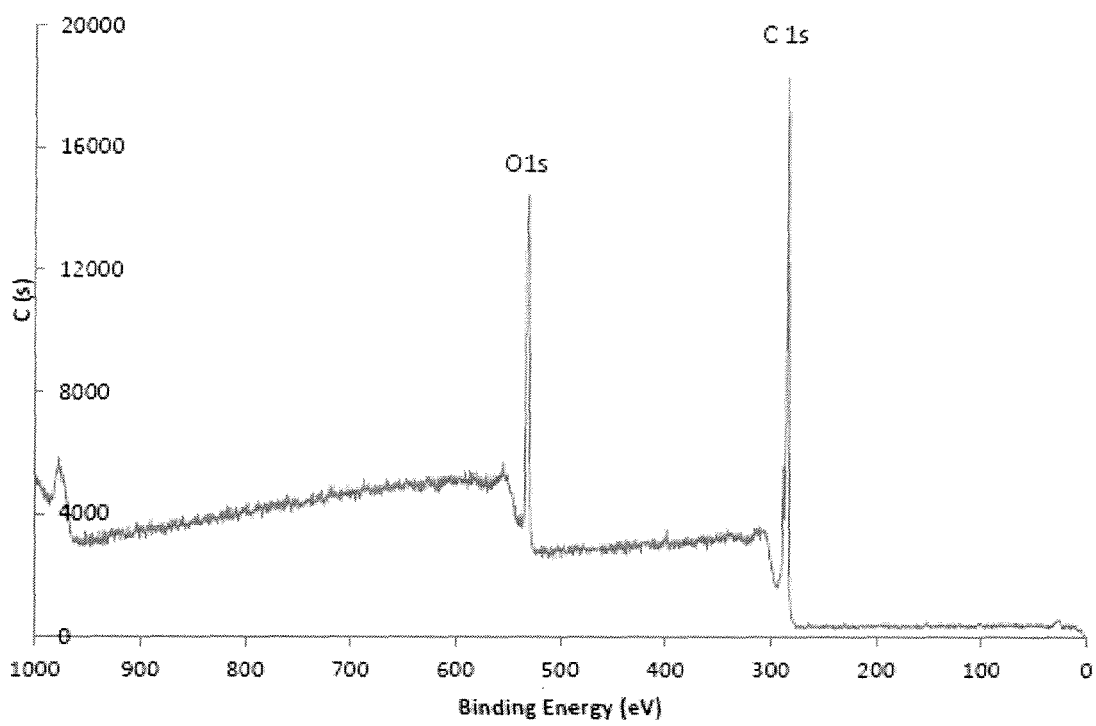
FIG. 1 shows an XPS spectrum for an untreated PET drinking bottle (blank).

A method for removing contaminants from water include the removal of arsenic, and other toxic metals and metalloids.

Arsenic removal includes the removal of both arsenite and arsenate from water. Here thiol-containing molecules are directly attached or bound to a surface having ester linkages as functional groups. The surface may include drinking bottles made of PET or acrylic ester resins such as amberlite XAD-7.

Thiol-containing molecules are immobilized on the surface by aminolysis/acylation (amide bond formation) or through hydrogen bonding on both PET and acrylic ester resins. Acylation reactions can be catalyzed under both acidic and basic conditions. Base-catalyzed acylation reaction between cysteine and PET requires the —SH group be protected to prevent acylation via the thiolate (—S⁻). Cystine and glutathione undergo similar base-catalyzed acylation reaction mechanism on PET (and XAD-7.)

The thiol groups (SH) have a high affinity for arsenic and other toxic metals and metalloids. The availability of thiol (SH) or the thiolate (S⁻) is useful for the method to work. As a result, for cystine and glutathione, whose sulfur atoms are bonded to each other, SH groups are exposed after binding on the PET or XAD-7 surface via reduction of the disulfide bonds. In one embodiment, arsenic can be removed from water using the immobilized thiol-containing molecule via a continuous process or a batch process.

In one embodiment, the thiol-containing molecules used in this invention include molecules that are non-toxic and can be essential to the human body such as but not limited to cysteine, cystine and glutathione. Attachment of cysteine on a PET or XAD-7 surface requires that the amino group ($NH_2$) be the nucleophile. The amino group is a better nucleophile in the deprotonated form ($NH_2$) compared to the protonated form ($NH_3^+$) and, based on the pKa values of the three cysteine functional groups shown below, the amino, thiol and carboxyl groups, a pH ≥10 is used.

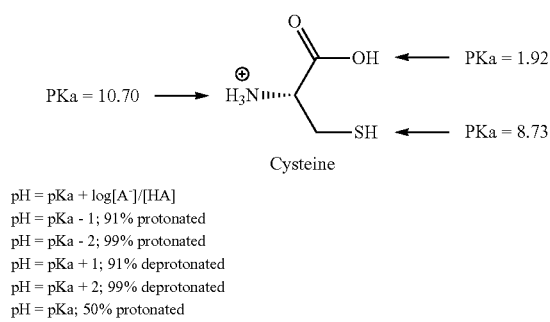

Cysteine pH = pKa + log[A⁻]/[HA]
pH = pKa - 1; 91% protonated
pH = pKa - 2; 99% protonated
pH = pKa + 1; 91% deprotonated
pH = pKa + 2; 99% deprotonated
pH = pKa; 50% protonated At such pH values, the SH will be fully deprotated to the thiolate (S⁻), which is a much stronger nucleophile than the $NH_2$. Under these conditions, the acylation reaction will therefore involve S⁻ instead of the $NH_2$ group, making SH or S⁻ unavailable for binding of arsenic or other toxic metals and metalloids. To ensure the availability of the SH (or S⁻) group after binding of cysteine molecule on PET (or XAD-7), the group (SH) has to be protected during the binding of cysteine on PET. In one embodiment, the thiol group is protected by dimerizing cysteine to form cystine, in which the SH groups are protected by disulfide bonds, and then binding the dimer (cystine) on PET via aminolysis. Dimerization is achieved by stirring cysteine solution (25% w/v) in the open for 24 hours. The binding of cystine to the surface, PET or XAD-7, occurs at pH ranging from 10-12.

After the cystine is bound to the surface, the disulfide bonds are reduced to SH groups using dithiothreitol or zinc powder in 5% acetic acid. For example, the PET-cystine formed using dithiothreitol (1M) can occur at a pH 8 and at a temperature of 70° C. for an hour to convert PET-cystine to PET-cysteine by breaking the disulfide bonds in PET-cystine. The use of a pH of 8 allows for the conversion of the thiol group in dithiothreitol to the more reactive thiolate (S⁻) by deprotonation. In an embodiment, zinc powder in 5% acetic acid can be used instead of dithiothreitol to break the disulfide bonds in cystine. The cystine used may be either commercially available cystine or cystine obtained via oxidation of cysteine.

With the cysteine bound to PET, As(III) will be able to bind to the PET-cysteine at pH 2-8, with the most binding occurring at pH around 7. At pH 2-8, As(III) will be neutral while the thiol group on cysteine will either be protonated (no charge; at low pH) or deprotonated (negatively charged; at pH >7.) Neutral or negatively charged cysteine can easily bind neutral As(III). In some embodiments, a binding ratio of 1:3, As(III) to cysteine ([As(Cys)₃]) is attainable. It should be noted that the more flexible and the longer the distance between the sulfur atom and the PET (or XAD-7), the higher the chances of having more than one sulfur atom bind one arsenic atom. For instance, glutathione is a longer molecule than cysteine, thus glutathione has a better or increased chance of achieving a 1:3 binding ratio of S:As. Binding decreases as pH becomes more basic.

The present invention takes advantage of the weakness or lack of binding of arsenic (As) at more alkaline pH to strip the bound As(III) from PET during the regeneration process. Here the surface (PET or XAD-7) is run under a liquid having a high pH to reduce the binding between the arsenic already attached to the sulfur on the surface, thereby freeing the surface to attach more arsenic.

The mechanism of the binding of cystine via amide bond formation on PET includes the reduction of disulfide bridges in the PET-cystine molecules to form PET-cysteine using dithiothreitol as a reducing agent, and binding of arsenic by the immobilized cysteine. Here aminolysis occurs by incubating cystine (15-25% in deionized water) with the PET surface for 24 hours at a temperature of 40° C. and at a pH of between 10-12. In one embodiment the preferred pH is 11. Base catalysis can be used with cystine as cystine dissolves more in alkaline pH than acidic pH.

The immobilization of a glutathione on PET follows the same mechanism as cysteine binding. Amide bond formation is used to bind the glutathione to the PET at a pH of 11 and at a temperature of 40° C. for 24 hours. The disulfide bridges are reduced to form thiols (—SH groups) using a reduction agent such as dithiothreitol at a temperature of 70° C. and a pH 8 or Zn powder in 5% acetic acid. Arsenic As(III) is then bound at a pH between 5-8. At pH around 7, the binding As to S binding ratio is 1 to 3.

The binding of thiol containing molecules to XAD-7 via hydrogen bonding occurs at acidic pH. Cysteine is immobilized to XAD-7 at a pH between 2-4 and arsenic is removed at a pH of 2-4. Binding via hydrogen bonding eliminates the need for dithiothreitol or zinc powder in 5% acetic acid but binding has to be done under an inert atmosphere (no oxygen). For instance, in some embodiments direct binding of cysteine on XAD-7 is done under a nitrogen or argon atmosphere. Inert atmospheres are required to avoid the dimerization of cysteine to cysteine since dimerization would require converting cystine back to cysteine before binding arsenic.

The binding of cystine and glutathione to XAD-7 via amide bond-formation (aminolysis) occurs in the same manner as with PET. After binding, the disulfide bridges in cystine and glutathione are then reduced by the use of either dithiothreitol or Zn powder in 5% acetic acid to expose the thiol groups for arsenic binding.

The invention may be realized in a number of forms, either by use of treatment facilities or by incorporation into an individualized filtration device such as by using the thiol-PET or XAD-7 bottle to clean contaminated water. Such examples are illustrative and should not be construed as limiting.

EXAMPLE

Synthetic samples were prepared in both tap water (no arsenic) and Milli-Q deionized water under conditions that mimic natural water conditions. Ionic strength was adjusted using NaCl (20 mM final concentration) and pH was adjusted using 50% NaOH and HCl optima as appropriate. The As(III) and As(V) solutions were prepared from SPEX Certiprep, 1000 mg/L standards. Acid-washed (10% $HNO_3$) and oven dried (160-170° C.) glassware and reagent-grade or higher chemicals (Fisher Scientific) were used in all experiments and all solutions were prepared with Milli-Q deionized distilled water. The shredded plastic bottles (PET) and XAD-7 were cleaned prior to use by soaking the material in acetone for 24 hours followed by rigorous cleaning with deionized water.

The adsorbent material (PET-cysteine or XAD-7-cysteine) was prepared by adding a measured volume of cystine (25%) to the shredded and cleaned plastic bottles (PET) or cleaned XAD-7 and the mixture continuously mixed for 24 hours at pH 11 and at a temperature of 40 ° C. The PET-cystine (or XAD-7-cystine) was then converted to the desired PET-cysteine (or XAD-7-cysteine) by either adding Zn powder in 5% acetic acid or 1M dithiothreitol at pH 8 to the air-dried PET-cystine (or XAD-7-cystine) and mixing continuously for one hour.

The PET-cysteine (or XAD-7-cysteine) was either vacuum-oven dried or air-dried and stored until required for testing. Air-dried and vacuum-oven dried PET-cysteine and XAD-7-cysteine gave similar results. In some experiments, cysteine was directly bonded on XAD-7 through hydrogen bonding at pH 1-2.

Figure 2:
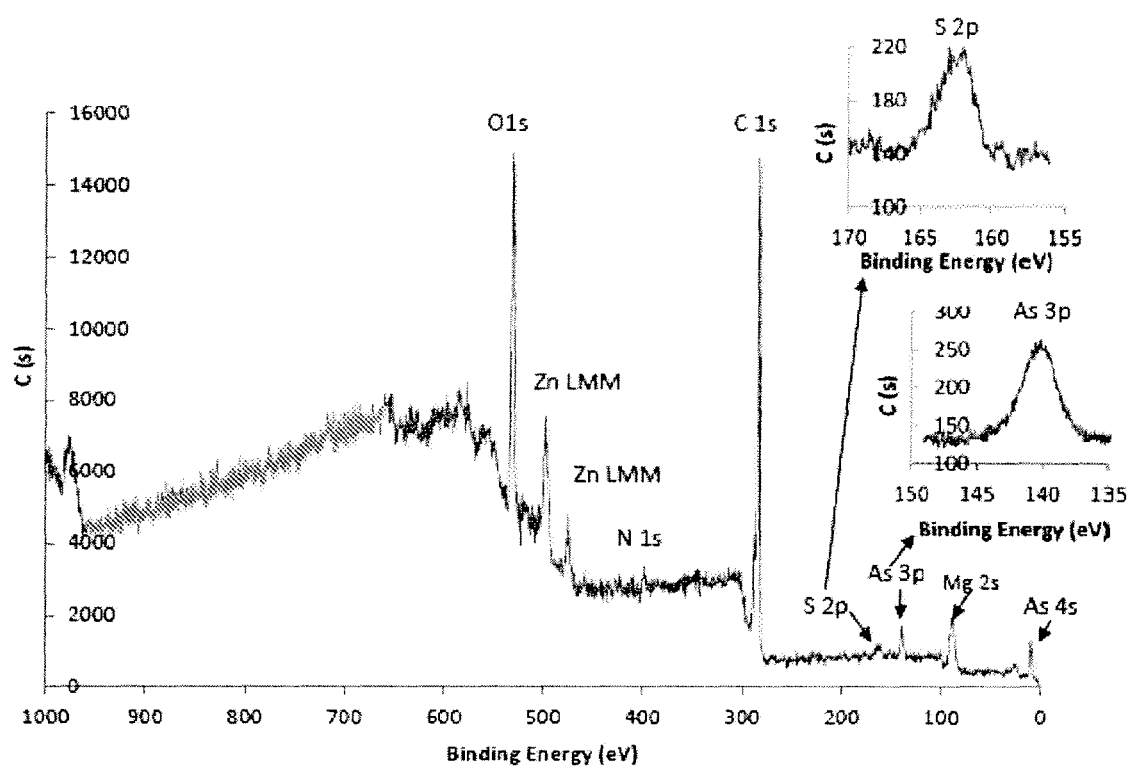
FIG. 2 shows the same PET bottle in FIG. 1 but after attaching cystine (cysteine) and subsequent removal of As(III).

FIG. 1 shows an XPS spectrum of the surface of the cleaned, blank PET (no-thiol-containing molecule attached.) The sample was randomly selected from dozens of pieces of the polymer (plastic soda bottle) that were processed together. FIG. 2 shows the XPS spectrum of the PET shred after attaching cystine (cysteine) and subsequent removal of As(III).

FIG. 3 shows data obtained in some of the experiments in which the prepared PET-cysteine (or XAD-7-cysteine) was used to remove As(III) in synthetic samples. The data in FIG. 3 clearly shows that the method in this invention is extremely effective in removing As(III) from water. In contrast, most current methods require an added step of converting the As(III) to As(V) before it is removed from water. Besides the treatment of drinking water, the method can be used to treat waste water, both domestic and industrial, and the treatment of water intended for use in various industries where the quality of the final product is dependent on the quality of water used, among other requirements. Such industries include food and pharmaceutical industries. The method removes other toxic metals and metalloids in addition to arsenic.

While the present invention has been described in conjunction with specific embodiments, those of normal skill in the art will appreciate the modifications and variations can be made without departing from the scope and the spirit of the present invention. Such modifications and variations are envisioned to be within the scope of the appended claims.

The invention claimed is:

1. A method for removing contaminants from water comprising:
   shredding PET plastic into plastic pieces;
   cleaning the plastic pieces;
   mixing cystine and the cleaned plastic pieces resulting in cystine coated plastic pieces;
   adding a reducing agent to reduce disulfide bridges in the cystine of the cystine coated plastic pieces resulting in a cysteine coated plastic pieces;
   drying the cysteine coated plastic pieces; and
   introducing an arsenic contaminated aqueous liquid to the cysteine coated plastic pieces, wherein arsenic is removed from the arsenic contaminated aqueous liquid as a result of said arsenic being bound to the cysteine coated plastic pieces.

2. The method of claim 1 wherein the cystine is mixed at a basic pH at 40° C. for 24 hours.

3. The method of claim 1 wherein the reducing agent is Zn powder in 5% acetic acid.

4. The method of claim 1 wherein the reducing agent is 1M dithiothreitol at pH 8.

5. A method for removing contaminants from water comprising:
   cleaning acrylic ester resins;
   mixing cystine and the cleaned acrylic ester resins forming an amide bond between the cystine and ester on the surface of the acrylic ester resins resulting in cystine coated acrylic ester resins;
   adding a reducing agent to reduce disulfide bridges in the cystine of the cystine coated acrylic ester resins resulting in a cysteine coated acrylic ester resins;
   drying the cysteine coated acrylic ester resins; and
   introducing an arsenic contaminated aqueous liquid to the cysteine coated acrylic ester resins, wherein arsenic is removed from the arsenic contaminated aqueous liquid as a result of said arsenic being bound to the cysteine coated acrylic ester resins.

6. The method of claim 5 wherein the cystine is mixed at a basic pH at 40° C. for 24 hours.

7. The method of claim 5 wherein the reducing agent is Zn powder in 5% acetic acid.

8. The method of claim 5 wherein the reducing agent is 1M dithiothreitol at pH 8.

9. A method for removing contaminants from water comprising:
   cleaning a PET surface having an ester;
   immobilizing a non-toxic thiol containing molecule on the cleaned PET surface by acylation on the ester resulting in a non-toxic thiol containing molecule-coated surface;
   drying the non-toxic thiol containing molecule-coated surface; and
   introducing an aqueous liquid to the non-toxic thiol containing molecule-coated surface, wherein toxins are removed from the aqueous liquid as a result of said toxins being bound to the non-toxic thiol containing molecule of the non-toxic thiol containing molecule-coated surface.

10. The method of claim 9 wherein the toxins are toxic metalloids.

11. The method of claim 9 wherein the toxins are toxic metals.

12. The method of claim 9 wherein the non-toxic thiol containing molecule is a dimer with disulfide bridges.

13. The method of claim 12 further comprising adding a reducing agent to convert the dimer into a monomer.

* * * * *